(12) United States Patent
Ben Hellal et al.

(10) Patent No.: US 12,537,865 B2
(45) Date of Patent: Jan. 27, 2026

(54) ELECTRONIC INTERCONNECTION APPARATUS ADAPTED TO INTERCONNECT A PLURALITY OF AUDIO EQUIPMENTS, AND AUDIO SYSTEM COMPRISING SUCH AN APPARATUS

(71) Applicant: ELNO, Argenteuil (FR)

(72) Inventors: Khaled Ben Hellal, Argenteuil (FR); Guillaume Baron, Mesnil-Esnard (FR); Thierry Gaiffe, Saint Germain En Laye (FR)

(73) Assignee: ELNO, Argenteuil (FR)

( * ) Notice: Subject to any disclaimer, the term of this patent is extended or adjusted under 35 U.S.C. 154(b) by 437 days.

(21) Appl. No.: 18/301,219

(22) Filed: Apr. 15, 2023

(65) Prior Publication Data

US 2023/0344884 A1 Oct. 26, 2023

(30) Foreign Application Priority Data

Apr. 20, 2022 (FR) ...................................... 2203629

(51) Int. Cl.
*H04L 12/00* (2006.01)
*G06F 3/16* (2006.01)
*H04L 65/4061* (2022.01)

(52) U.S. Cl.
CPC .......... *H04L 65/4061* (2013.01); *G06F 3/162* (2013.01)

(58) Field of Classification Search
CPC .. H04L 65/4061; G06F 3/162; H04M 1/6058; H04M 1/172409; H04M 1/172094; H04M 1/172454; H04M 1/172466; H04M 1/60
USPC ....................................................... 370/329
See application file for complete search history.

(56) References Cited

U.S. PATENT DOCUMENTS

| | | | | |
|---|---|---|---|---|
| 7,433,680 | B2* | 10/2008 | Jenkins | ............... H04L 65/4061 |
| | | | | 455/412.2 |
| 9,432,495 | B2* | 8/2016 | Moore | ..................... G10L 17/22 |
| 9,503,867 | B2* | 11/2016 | Wong | .................... H04R 1/1083 |
| 10,643,619 | B2* | 5/2020 | Yang | ....................... G10L 13/00 |
| 10,963,214 | B2* | 3/2021 | Ding | .................... H04R 29/001 |

(Continued)

FOREIGN PATENT DOCUMENTS

| | | | |
|---|---|---|---|
| EP | 2845115 B1 | 10/2016 | |
| WO | WO-2006029306 A1 * | 3/2006 | ........ H04M 3/42068 |
| WO | WO-2017088046 A1 * | 6/2017 | ............. G06F 3/014 |

OTHER PUBLICATIONS

FR 2203629, INPI Rapport de Recherche Preliminaire, Feb. 16, 2023, 2 pages.

*Primary Examiner* — Frantz Coby
(74) *Attorney, Agent, or Firm* — Soquel Group LLC

(57) ABSTRACT

An electronic interconnection apparatus adapted for interconnecting a plurality of audio equipment including several communication ports, each configured for being connected to a respective audio equipment, at least one selector configured for selecting a value of an operating parameter according to a manipulation by an operator, at least one push-to-talk button configured for authorizing the transmission of an audio signal following an operator action, and an electronic processing device connected to each selector and each push-to-talk button, configured for acquiring an input audio signal via a communication port and for delivering an output audio signal to another communication port, each communication port being according to a digital communication standard.

18 Claims, 2 Drawing Sheets

(56) References Cited

U.S. PATENT DOCUMENTS

| | | | |
|---|---|---|---|
| 2004/0204074 A1* | 10/2004 | Desai | H04M 1/72409 |
| | | | 455/566 |
| 2007/0111754 A1* | 5/2007 | Marshall | H04B 1/3833 |
| | | | 455/556.1 |
| 2008/0014865 A1* | 1/2008 | Roberts | H04W 4/10 |
| | | | 455/11.1 |
| 2011/0085655 A1* | 4/2011 | Elliott | H04M 3/56 |
| | | | 370/352 |
| 2011/0177778 A1 | 7/2011 | Roberts et al. | |
| 2016/0050547 A1* | 2/2016 | Wong | H04M 1/6058 |
| | | | 455/518 |
| 2018/0034302 A1 | 2/2018 | Van Den Berg | |
| 2018/0343024 A1* | 11/2018 | Sahebjavaher | H04M 1/0202 |
| 2019/0075399 A1* | 3/2019 | Nyegaard | H04L 12/1827 |
| 2020/0058305 A1* | 2/2020 | Yang | G10L 13/00 |

* cited by examiner

ELECTRONIC INTERCONNECTION APPARATUS ADAPTED TO INTERCONNECT A PLURALITY OF AUDIO EQUIPMENTS, AND AUDIO SYSTEM COMPRISING SUCH AN APPARATUS

REFERENCE TO RELATED APPLICATION

This application is a U.S. non-provisional application claiming the benefit of French Application No. 22 03629, filed on Apr. 20, 2022, the contents of which are incorporated herein by reference in their entirety.

TECHNICAL FIELD OF THE INVENTION

The present invention relates to an electronic interconnection apparatus adapted for interconnecting a plurality of audio equipment. The audio equipment is a headgear including at least one element amongst a microphone and an audio receiving module, and at least one other audio equipment is selected from a radio and an intercommunication system.

The invention further relates to an audio system intended for equipping an operator, in particular an infantryman, the system comprising such headgear and such electronic interconnection apparatus connected to the headgear and intended for being connected to at least one such other audio equipment selected from among the radio and the intercommunication system.

BACKGROUND OF THE INVENTION

Document EP 2 845 115 B1 discloses an electronic interconnection apparatus of the aforementioned type, the apparatus also being called a PTT (Push-to-Talk) device. Such a PTT device then includes at least one push button for speaking, i.e. a PTT button, configured for—following an action by the user—authorizing the transmission of an audio signal, in particular on a channel previously associated with the PTT button.

The PTT device includes several analog communication ports, each being adapted to be connected to a respective audio equipment, and the aforementioned document then relates more precisely to particular cables for connecting the audio equipment to the PTT device, each cable including a memory for storing information relating to the audio equipment associated with the cable, so as to facilitate the association of each audio equipment with the PTT device.

However, the PTT device with such connection cables is not very practical in use, since the PTT device requires in particular storing beforehand, in each cable, information relating to the different audio equipment.

SUMMARY OF THE INVENTION

The goal of the invention is then to propose an electronic interconnection apparatus for facilitating the interconnection of the different audio equipment, i.e., the connection of each audio equipment to the interconnection apparatus.

To this end, the subject matter of the invention relates to an electronic interconnection apparatus adapted to interconnect a plurality of audio equipment, the apparatus including:
 several communication ports, each configured for being connected to a respective audio equipment, wherein one audio equipment is a headgear including at least one amongst a microphone and an audio receiving module, at least one other audio equipment selected from a radio and an intercom system;
 at least one selector configured for selecting, according to a manipulation by an operator, a value of an operating parameter;
 at least one push-to-talk button configured for authorizing, following an action by the operator, emission of an audio signal;
 an electronic processing device connected to each selector and each push-to-talk button, configured for acquiring an input audio signal via a communication port and for delivering an output audio signal to another communication port, the output signal being obtained from the input audio signal,
each communication port being according to a digital communication standard.

With the electronic interconnection apparatus according to the invention, each communication port is according to a digital communication standard, which facilitates connection of each audio equipment to the electronic interconnection apparatus, each audio equipment then being adapted to exchange, according to the digital communication standard, appropriate initialization information with the interconnection apparatus.

In other words, each communication port is a digital port, and may be used for automatic configuration of the connection between the corresponding audio equipment and the interconnection apparatus. The configuration is then transparent for a user, such as an operator, in particular an infantryman, and the use of the interconnection apparatus according to the invention is thus much simpler for the user.

Preferably, each communication port is according to a USB (Universal Serial Bus) standard, and configuration of the connection between the interconnection apparatus and the audio equipment also according to the USB standard is further facilitated.

Yet preferably, configuration of the apparatus is adapted according to an orientation of the apparatus with respect to the direction of extension thereof, the configuration being modified, in particular, if a change of orientation of the apparatus is detected. Indeed, the interconnection apparatus is preferably adapted to be positioned on the left chest, or on the right chest, respectively, of the user; and the switch from a positioning on the left chest to a positioning on the right chest then takes place preferably via a reversal of the interconnection apparatus with respect to a median plane.

Again preferably, the connectors, the selectors and the push-to-talk buttons are correspondingly arranged on each side of the median plane. In this way it is possible to propose a symmetrical operation of the apparatus whether same is positioned on the left chest, or vice versa on the right chest of the user.

According to other advantageous aspects of the invention, the interconnection electronic apparatus includes one or several the following features, taken individually or according to all technically possible combinations:
 the digital communication standard is a USB standard;
 the apparatus includes several connectors, each associated with a respective communication port, several selectors and several push-to-talk buttons, and the connectors, the selectors and the push-to-talk buttons, respectively, are arranged on either side of a median plane of the apparatus;
 the same number of connector(s), the same number of selector(s), and of push-to-talk buttons, respectively, are preferably arranged on each side of the median plane;

the apparatus extending along a direction of extension, and the median plane being preferably yet perpendicular to the direction of extension;

the number of connectors and the number of selectors and the number of push-to-talk buttons are each a respective even number;

the number of connectors is preferably equal to four, the number of selectors is equal to two, and the number of push-to-talk buttons is equal to four, and on each side of the median plane are then arranged two connectors, a selector, and two push-to-talk buttons, respectively;

the apparatus further includes a management module configured for managing a configuration of at least one of the communication ports, the at least one selector and the at least one push-to-talk button;

the management module is adapted to receive a configuration file, and is configured for modifying the configuration according to the configuration file received;

the apparatus extends in a direction of extension, and the management module is configured for modifying the configuration in case of detection of a change of orientation of the apparatus with respect to the direction of extension;

the direction of extension is preferably vertical, in particular when the apparatus is worn by an operator along the operator's body;

the apparatus further includes a sensor configured for detecting a change of orientation of the apparatus with respect to the direction of extension, the management module being connected to the sensor and configured for detecting the change of orientation via the sensor;

the sensor being preferably an accelerometer;

the management module is adapted to detect a connection of the headgear with one of the communication ports, and is configured for determining the orientation of the apparatus, according to the communication port connected to the headgear;

the number of selectors is greater than or equal to two, and the configuration of each selector includes the association with a respective operating parameter;

the operating parameter being preferably selected from the group consisting of: a received sound volume, an identifier of a set of one or several reception channels, and a transmission sound volume, preferably with a transmission mute function;

the number of selectors is equal to two, with one selector situated in the upper part of the apparatus according to the current orientation of the apparatus, and the other selector situated in the lower part according to the orientation, and the management module is further configured for associating a predefined operating parameter with the selector at the upper part;

the management module being preferably configured for changing association between selectors and respective operating parameters in case of detection of a change of orientation of the apparatus;

the number of push-to-talk buttons is greater than or equal to two, and the configuration of each push-to-talk button includes the association with a respective set of one or several channels on which the audio signal is transmitted;

the apparatus further includes a wireless communication module configured for communicating with a respective audio equipment according to a radio communication protocol;

the wireless communication module being preferably a short-range module, such as a range being less than 100 m;

the radio communication protocol preferably being according to a BLUETOOTH® standard, such as version 5.0 or a later version.

The invention further relates to an audio system intended for equipping an operator, in particular an infantryman, the system including:

a headgear including at least one amongst a microphone and an audio receiving module, and an electronic interconnection apparatus connected to the headgear and intended for being connected to at least one other audio equipment selected from a radio and an intercommunication system, the electronic interconnection apparatus being as defined above.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

Figure 1:
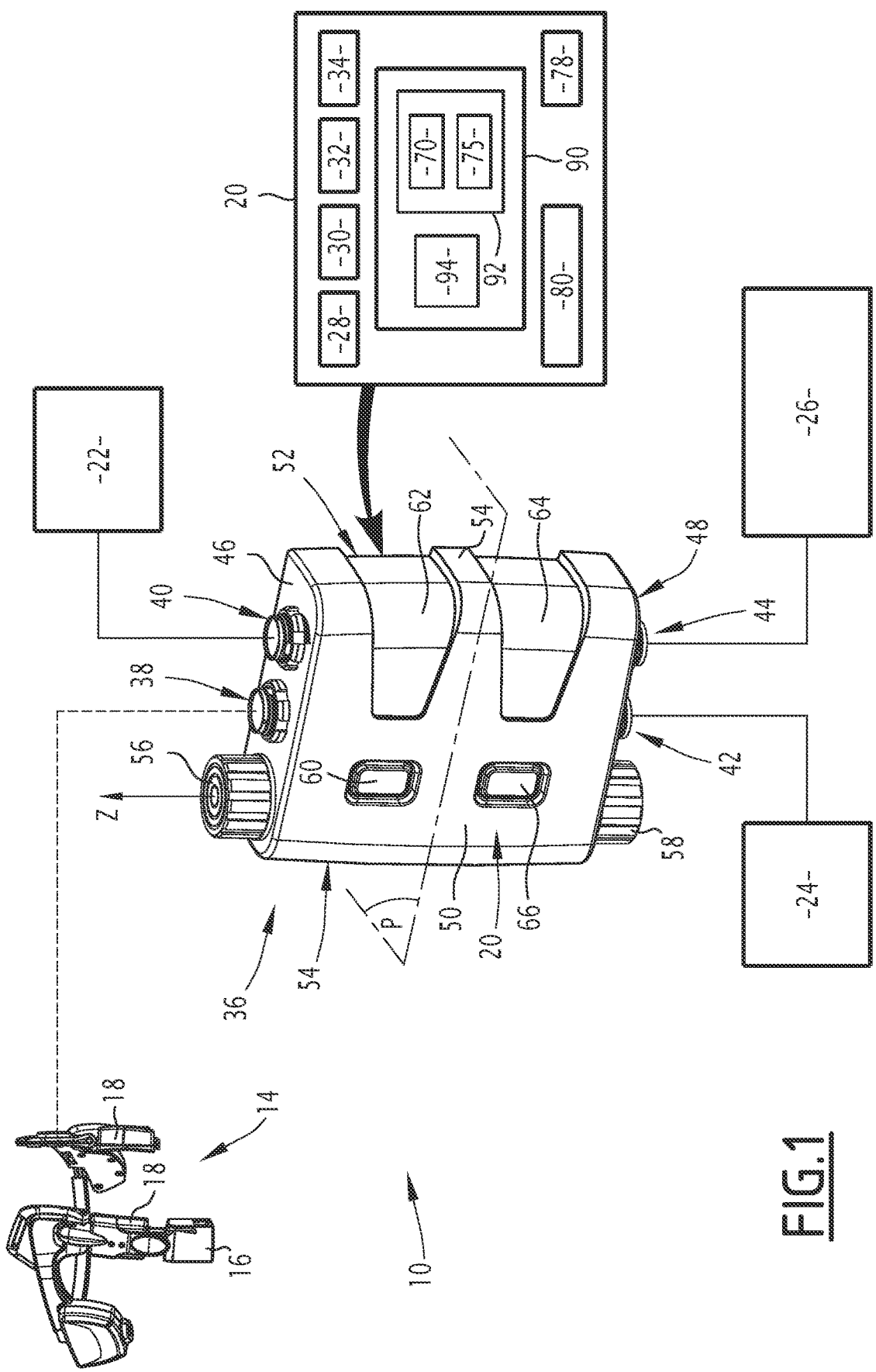
FIG. 1 is a schematic representation of an audio system intended for equipping an operator, such as an infantryman, the system comprising an electronic interconnection apparatus, shown in perspective, and one or several audio equipment, such as a headgear, a first radio, a second radio and an intercommunication system; the interconnection apparatus being connected to the headgear and to each of the other audio equipment, namely the first radio, the second radio and the intercommunication system.
Figure 2:
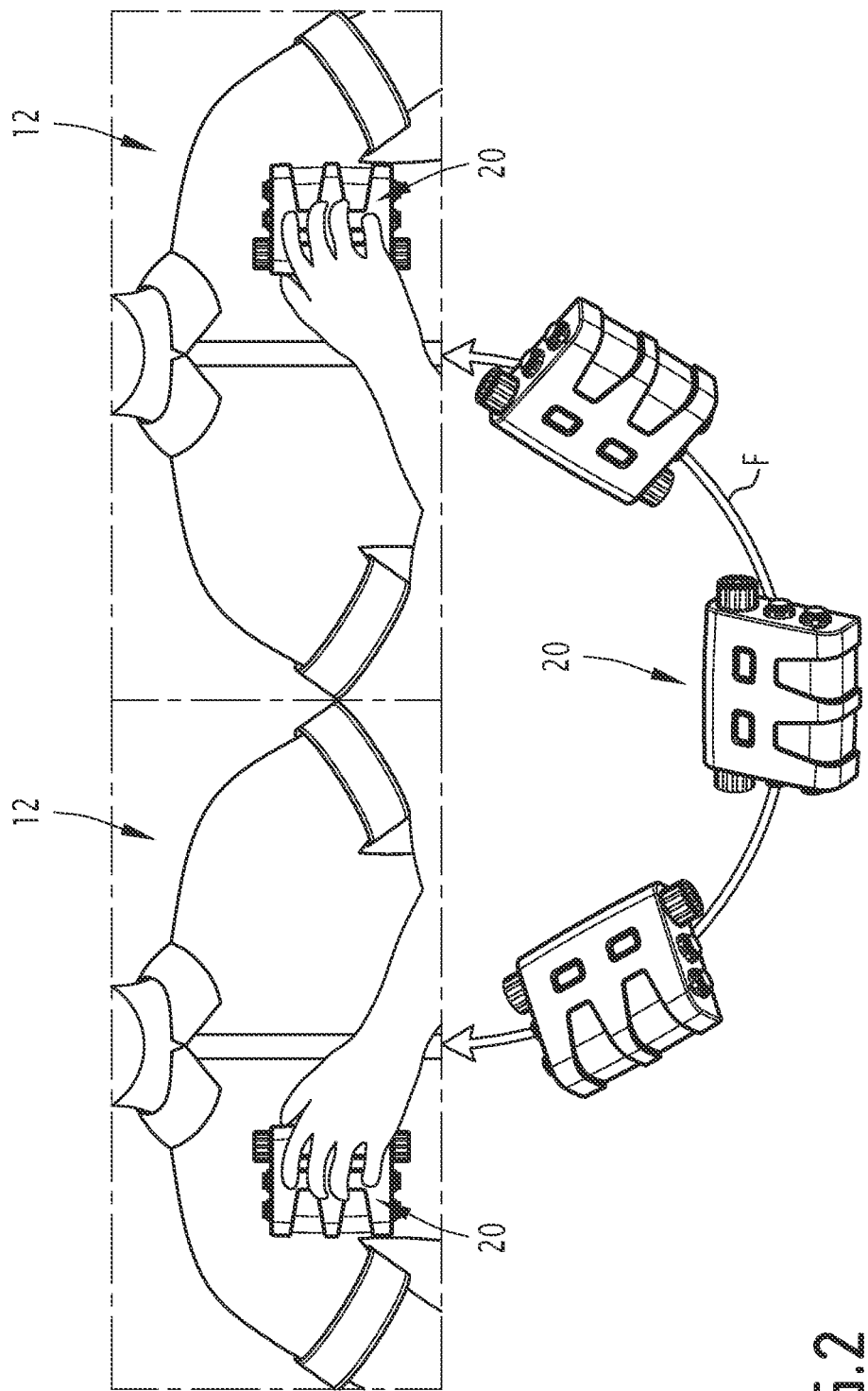
FIG. 2 is a schematic view showing a change of position of the interconnection apparatus shown in FIG. 1, from a position on the operator's right chest to a position on the left chest, and vice versa, such a change of positioning taking place by reversing the interconnection apparatus with respect to a median plane of the interconnection apparatus.

In FIG. 1, an audio system 10 is intended for equipping an operator 12, in particular an infantryman, as visible in FIG. 2.

Audio system 10 includes a headgear 14 including at least one amongst a microphone 16 and an audio receiving module 18; and an electronic interconnection apparatus 20 connected to headgear 14 and intended for being connected to at least one other audio equipment selected from a radio 22, 24 and an intercommunication system 26.

In the example shown in FIG. 1, audio system 10 includes two radios, namely first radio 22 and second radio 24, as well as intercommunication system 26. First radio 22, second radio 24 and intercommunication system 26 are known per se.

In the example shown in FIG. 1, electronic interconnection apparatus 20, called hereinafter interconnection apparatus 20, is then connected to headgear 14 and to each of the other audio equipment, namely to first radio 22, to second radio 24 and to intercommunication system 26.

Headgear 14 and interconnection apparatus 20 are configured for being worn by operator 12, as shown partially in FIG. 2, where interconnection apparatus 20 is worn either on the left chest of operator 12, or else on the right chest of operator 12.

First radio 22 and second radio 24 may also be carried by operator 12, or alternatively are positioned in a vehicle (not shown), inside which operator 12 is situated. Intercommunication system 26 is preferably positioned in the vehicle. In a variant, intercommunication system 26 may also be carried by operator 12.

Headgear 14 is known per se and preferably includes at least one microphone 16 and two audio receiving modules 18. An example of such a headgear 14 is described in the document FR 3 019 422 A1 published on Oct. 2, 2015.

In the example shown in FIG. 1, microphone 16 is also called an osteophonic microphone and is adapted to receive vibratory oscillations through bone conduction and to transform the vibrations into a respective electrical signal. In the example, each audio receiving module 18 is an osteophonic module, and includes in particular a bone mechanical excitation transducer, adapted to transform a received electrical signal into a vibratory wave representative of a sound signal, and to transmit the vibratory wave to the auditory nerve of operator 12, through bone conduction.

In a variant, microphone 16 is an aerial microphone adapted to receive acoustic sound waves and to transform same into a respective electrical signal.

In a further variant, each audio receiving module 18 is an acoustic module including a loudspeaker adapted to transform a received electrical signal into a sound wave, and then to transmit the sound wave to the auditory nerve of operator 12, by air conduction through the respective ear of the operator, in particular through the operator's ear canal.

Interconnection apparatus 20 is configured for interconnecting a plurality of audio equipment 14, 22, 24, 26, and then includes several communication ports 28, 30, 32, 34, each configured for being connected to a respective audio equipment 14, 22, 24, 26.

In the example shown in FIG. 1, interconnection apparatus 20 includes a first communication port 28 connected to headgear 14, a second communication port 30 connected to first radio 22, a third communication port 32 connected to second radio 24, and a fourth communication port 34 connected to intercommunication system 26.

In addition, interconnection apparatus 20 includes a case 36 and several connectors 38, 40, 42, 44, each being attached to case 36 and associated with a respective communication port 28, 30, 32, 34. Case 36 extends substantially along a direction of extension, such as the vertical direction Z in the example shown in FIG. 1, and includes an upper wall 46, a lower wall 48, a front wall 50, a rear wall 52 intended typically for being in contact with operator 12, and two lateral walls 54 connecting front wall 50 to rear wall 52. Front wall 50, rear wall 52 and the two side walls 54 connect upper wall 46 to lower wall 48, while being substantially perpendicular thereto. Upper wall 46 and lower wall 48 each extend substantially along a respective plane perpendicular to the direction of extension, such as in a respective horizontal plane perpendicular to the vertical direction Z. Front wall 50, rear wall 52 and the two side walls 54 each extend substantially in a respective plane including the direction of extension, such as in a respective vertical plane containing the vertical direction Z.

In the example shown in FIG. 1, interconnection apparatus 20 includes a first connector 38 associated with first communication port 28, a second connector 40 associated with second communication port 30, a third connector 42 associated with third communication port 32, and a fourth connector 44 associated with fourth communication port 34.

As an optional addition, the connectors 38, 40, 42, 44 are preferably arranged on each side of a median plane P of interconnection apparatus 20. The median plane P is typically a plane perpendicular to the direction of extension of the interconnection apparatus 20, such as a horizontal plane perpendicular to the vertical direction of extension in the example shown in FIG. 1. Yet preferably, the same number of connectors 38, 40, 42, 44 are arranged on each side of median plane P.

In yet an optional addition, if interconnection apparatus 20 includes an even number of connectors 38, 40, 42, 44, half of connectors 38, 40, 42, 44 are arranged on one side of median plane P, and the other half is arranged on the other side of median plane P. According to the optional addition, connectors 38, 40, 42, 44 are preferably arranged symmetrically with respect to median plane P.

In the example shown in FIG. 1, first and second connectors 38, 40 are arranged through upper wall 46, and third and fourth connectors 42, 44 are arranged through lower wall 48. Connectors 38, 40, 42, 44 are preferably militarized connectors, such as connectors being according to the DEFENSE GAM T2 standard.

In the example shown in FIG. 1, first and second connectors 38, 40 are then arranged on one side of median plane P, and third and fourth connectors 42, 44 are arranged on the other side of median plane P. First connector 38 is preferably arranged symmetrically with third connector 42 with respect to median plane P. Similarly, second connector 40 is preferably arranged symmetrically with fourth connector 44 with respect to median plane P.

In the example shown in FIG. 1, first connector 38 is then configured for receiving a supplementary connector (not shown) of a cable, connecting with headgear 14; second connector 40, and respectively third connector 42, are each configured for receiving a supplementary connector (not shown) of a cable, for linking with the first radio 22, and with the second radio 24, respectively; and fourth connector 44 is configured for receiving a supplementary connector ((not shown)) of a cable, for linking with intercommunication system 26.

Interconnection apparatus 20 includes at least one selector 56, 58, and at least one push-to-talk button 60, 62, 64, 66.

As an optional addition, interconnection apparatus 20 includes several selectors 56, 58. Selectors 56, 58 are preferably arranged on each side of median plane P of interconnection apparatus 20. Yet preferably, the same number of selector(s) 56, 58 is arranged on each side of median plane P.

As yet an optional addition, when interconnection apparatus 20 includes an even number of selectors 56, 58, one half of selectors 56, 58 is arranged on one side of median plane P, and the other half is arranged on the other side of median plane P. According to such optional addition, selectors 56, 58 are yet preferably arranged symmetrically with respect to median plane P.

In the example shown in FIG. 1, interconnection apparatus 20 includes two selectors 56, 58; namely a first selector 56 and a second selector 58. First selector 56 is, e.g., arranged in contact with upper wall 46, and second selector 58 is, e.g., arranged in contact with lower wall 48. First selector 56 and second selector 58 are then arranged on each side of horizontal median plane P of interconnection apparatus 20. Preferably, first selector 56 and second selector 58 are arranged substantially symmetrically with respect to median plane P.

As an optional addition, interconnection apparatus 20 includes several push-to-talk buttons 60, 62, 64, 66. Push-to-talk buttons 60, 62, 64, 66 are preferably arranged on each side of median plane P of interconnection apparatus 20. Yet preferably, the same number of speaking push buttons 60, 62, 64, 66 are arranged on each side of median plane P.

As an optional addition, if interconnection apparatus 20 includes an even number of push-to-talk buttons 60, 62, 64, 66, half of push-to-talk buttons 60, 62, 64, 66 are arranged on one side of median plane P, and the other half is arranged on the other side of median plane P. According to such optional addition, push-to-talk buttons 60, 62, 64, 66 are yet preferably arranged symmetrically with respect to median plane P.

In the example shown in FIG. 1, interconnection apparatus 20 includes four push-to-talk buttons 60, 62, 64, 66; namely a first push-to-talk button 60, a second push-to-talk button 62, a third push-to-talk button 64, and a fourth push-to-talk button 66. First and fourth push-to-talk buttons 60, 66 are, e.g., arranged in front wall 50, and second and third push-to-talk buttons 62, 64 are, e.g., arranged in a respective side wall 54, while partially going over front wall 50. First and second push-to-talk buttons 60, 62 are arranged, e.g., on one side of median plane P, and third and fourth push-to-talk buttons 64, 66 are arranged on the other side of median plane P. Preferably, first and fourth push-to-talk buttons 60, 66 are arranged symmetrically with respect to median plane P; and similarly, second and the third push-to-talk buttons 62, 64 are arranged symmetrically with respect to median plane P.

Interconnection apparatus 20 includes an electronic processing device 70 connected to each selector 56, 58 and to each push-to-talk button 60, 62, 64, 66.

As an optional addition, interconnection apparatus 20 further includes a module 75 for managing a configuration of at least one of communication ports 28, 30, 32, 34, at least one selector 56, 58 and at least one push-to-talk button 60, 62, 64, 66, management module 75 being then connected to the at least one element for which management module 75 is adapted for managing the associated configuration.

As an optional addition, interconnection apparatus 20 further includes a sensor 78 configured for detecting a change of orientation of apparatus 20 with respect to the direction of extension. Sensor 78 is, e.g., an accelerometer.

As yet an optional addition, interconnection apparatus 20 further includes a wireless communication module 80 configured for communicating with a respective audio equipment 14, 22, 24, 26 according to a radio communication protocol. Wireless communication module 80 is typically a short-range module, such as a range being less than 100 m. The radio communication protocol is according, e.g., to a BLUETOOTH® standard, such as version 5.0 or a later version. Wireless communication module 80 is known per se and typically includes a communication antenna and a radio transceiver (not shown), the radio transceiver being connected to the antenna and being according to the communication protocol.

In the example shown in FIG. 1, electronic processing apparatus 20 includes an information processing unit 90 consisting, e.g., of a memory 92 and of a processor 94 associated with memory 92.

In the example shown in FIG. 1, processing device 70 and management module 75 consist each of a software, or a software brick which may be executed by processor 94. Memory 92 of interconnection apparatus 20 is then adapted to store a processing software and a management software. Processor 94 is then adapted to execute each of the software programs among the processing software and the management software.

In a variant (not shown), processing device 70 and management module 75 each consist of a programmable logic component, such as an FPGA (Field Programmable Gate Array), or further of an integrated circuit, such as an ASIC (Application Specific Integrated Circuit).

When processing module 70 and management module 75 is produced in the form of one or several software programs, i.e., in the form of a computer program, same are further adapted of being recorded on a computer-readable medium (not shown). The computer-readable medium is, e.g., a medium adapted to store electronic instructions and to be coupled to a bus of a computer system. As an example, the readable medium is an optical disk, a magneto disk, a ROM memory, a RAM memory, any type of non-volatile memory (e.g. EPROM, EEPROM, FLASH, NVRAM), a magnetic card or an optical card. A computer program containing software instructions is then stored on the readable medium.

Each radio 22, 24 is known per se, and is typically a militarized radio when operator 12 is an infantryman.

Intercommunication system 26 is known per se, and is also called the intercom system. An example of such a system 26 is described in the document FR 2 988 543 A1 published on Sep. 27, 2013. Intercommunication system 26 is typically a militarized intercom system when the operator 12 is an infantryman.

According to the invention, each communication port 28, 30, 32, 34, in particular each of first 28, second 30, third 32 and fourth 34 communication ports, is according to a digital communication standard.

The digital communication standard is, e.g., a USB standard, such as the USB 2.0 standard or a later version.

Each selector 56, 58 is configured for selecting, as a function of a manipulation of operator 12—a value of an operating parameter. The operating parameter is typically selected from the group consisting of: a listening sound volume, an identifier of a set of one or several listening channels, and a transmission sound volume, preferably with a transmission mute function.

In the example of FIG. 1, first selector 56 is configured for selecting, following a manipulation by operator 12, the value of the identifier of the set of one or several reception channels; and second selector 58 is configured for selecting, following a manipulation by operator 12, the value of a respective sound volume, such as the sound volume in transmission or the sound volume in reception. In other words, in such example, first selector 56 is used for modifying the reception channel or channels, and second selector 58 is used for varying the value of the sound volume.

In the example shown in FIG. 1, each selector 56, 58 is in the form of a thumbwheel, the latter being typically movable in rotation about the axis of extension of interconnection apparatus 20, such as vertical axis Z.

Each push-to-talk button 60, 62, 64, 66 is configured for authorizing, following an action of operator 12, the transmission of an audio signal. Each push-to-talk button 60, 62, 64, 66 is associated with only one transmission channel, or is associated with a situation room with several transmission channels. A person skilled in the art will understand that when a respective push-to-talk button 60, 62, 64, 66 is associated with a respective situation room including several transmission channels, then the activation of push-to-talk button 60, 62, 64, 66 may be used for simultaneous audio transmission on all channels of the corresponding situation room.

The association of each push-to-talk button 60, 62, 64, 66 to a respective channel or a situation room is typically configured at the start-up of interconnection apparatus 20 from a predefined push-to-talk button 60, 62, 64, 66 configuration file.

Processing device 70 is configured for acquiring an input audio signal via a respective communication port 28, 30, 32, 34, and for delivering an output audio signal to another respective communication port 28, 30, 32, 34, the output signal being obtained from the input audio signal.

Management module 75 is configured for managing the configuration of at least one of communication ports 28, 30, 32, 34, the at least one selector 56, 58, and the at least one push-to-talk button 60, 62, 64, 66.

The configuration of each communication port 28, 30, 32, 34 includes, e.g., association with a respective audio equipment 14, 22, 24, 26.

The configuration of each selector 56, 58 includes, e.g., the association with a respective operating parameter.

The configuration of each push-to-talk button 60, 62, 64, 66 includes, e.g., the association with a respective set of one or several channels on which the audio signal is transmitted.

Optionally, management module 75 is adapted to receive a configuration file and is configured for modifying the configuration according to the configuration file received.

As an optional addition or in a variant, management module 75 is configured for modifying the configuration in the event of detection of a change of orientation of interconnection apparatus 20 with respect to the direction of extension.

According to the addition or to the variant, management module 75 may be used in particular for systematically associating the same operating parameter with selector 56, 58 arranged in the upper part of interconnection apparatus 20; and respectively, where appropriate, with selector 56, 58 arranged in the lower part of interconnection apparatus 20. The operating parameter systematically associated with selector 56, 58 arranged in the upper part is, e.g., the identifier of the set of one or several reception channels, and the operating parameter systematically associated with selector 56, 58 arranged in the lower part is, e.g., a respective sound volume, such as a reception sound volume or yet a reception sound volume.

According to such addition or such variant, and when interconnection apparatus 20 includes sensor 78, management module 75 is preferably connected to sensor 78 and then configured for detecting the change of orientation via sensor 78.

According to such addition or such variant, management module 75 is—also or in a variant—adapted to detect a connection of headgear 14 with one of communication ports 28, 30, 32, 34, and is then configured for determining orientation of apparatus 20, depending on the communication port 28, 30, 32, 34 connected to headgear 14. Where appropriate, management module 75 is typically configured for determining that communication port 28, 30, 32, 34 connected to headgear 14 and the or one of communication ports 28, 30, 32, 34 is arranged in the upper part of apparatus 20, or oriented upwards, then for inferring therefrom the orientation of apparatus 20.

For detection of connection of headgear 14 with one of communication ports 28, 30, 32, 34, management module 75 is configured, e.g., for acquiring an identifier of each audio equipment 14, 22, 24, 26 connected to a communication port 28, 30, 32, 34, and for determining then to which respective communication port 28, 30, 32, 34 audio equipment 14, 22, 24, 26, the identifier of which corresponds to headgear 14, is connected. Such acquisition of an identifier is typically performed via an exchange of message(s) according to the digital communication standard to which each communication port 28, 30, 32, 34 conforms.

As an optional addition, management module 75 is further configured for associating a predefined operating parameter with selector 56, 58 at the upper part. According to such optional addition, management module 75 is preferably configured for changing the association between selectors 56, 58 and respective operating parameters in the event of detection of a change of orientation of interconnection apparatus 20.

Thereby, interconnection apparatus 20 according to the invention facilitates interconnection of the different audio equipment 14, 22, 24, 26, i.e., the connection of each respective audio equipment 14, 22, 24, 26 to interconnection apparatus 20. Indeed, since each communication port 28, 30, 32, 34 is according to the digital communication standard, each audio equipment 14, 22, 24, 26 exchanges during connection to interconnection apparatus 20 thereof, and according to the digital communication standard, appropriate initialization information, in particular the identifier thereof, with interconnection apparatus 20. In this way it is possible to automate configuration of the corresponding audio equipment 14, 22, 24, 26 when same is connected to interconnection apparatus 20, and thus to facilitate interconnection of the audio equipment 14, 22, 24, 26.

Furthermore, the adaptation of the configuration of interconnection apparatus 20 according to the orientation thereof is particularly facilitated, and thus allows operator 12 to switch very easily from a positioning of interconnection apparatus 20 on the operator's left chest to a positioning on the operator's right chest, and vice versa, as shown in the example in FIG. 2. Such change of positioning then takes place simply by reversing interconnection apparatus 20 with respect to median plane P, as illustrated by arrow F.

A person skilled in the art will also observe that optional and complementary features, different from each other, facilitate again the adaptation of the configuration in the event of a reversal of interconnection apparatus 20. Indeed, such reversal is facilitated by the arrangement of connectors 38, 40, 42, 44 on either side of median plane P, and/or by arrangement of the selectors 56, 58 on either side of median plane P, and/or by arrangement of the push-to-talk buttons 60, 62, 64, 66 on either side of median plane P. A person skilled in the art will also understand that when such arrangement of connectors 38, 40, 42, 44 and/or of selectors 56, 58 and/or of the push-to-talk buttons 60, 62, 64, 66 on either side of median plane P is a symmetrical arrangement with respect to median plane P, then the reversal is further facilitated.

Such reversal is also facilitated by the ability of management module 75 to modify configuration of at least one of communication ports 28, 30, 32, 34, selectors 56, 58 and push-to-talk buttons 60, 62, 64, 66, if a change of orientation of the interconnection apparatus is detected 20. Such modification of configuration, in particular modification of the coupling between selector 56, 58 and an associated operating parameter, in the event of a change of orientation of interconnection apparatus 20, typically makes it possible that the operating parameter associated with selector 56, 58 arranged in the upper part is systematically the same parameter, and in a similar way that the operating parameter associated with selector 56, 58 arranged in the lower part is also systematically the same other parameter.

In this way it is possible to greatly facilitate use of interconnection apparatus 20 by operator 12 since the latter may then always vary the same operating parameter with selector 56, 58 arranged in the upper part of interconnection apparatus 20, and similarly the same other operating parameter with selector 56, 58 arranged in the lower part.

It will then be understood that electronic interconnection apparatus 20 according to the invention facilitates interconnection of the different audio equipment 14, 22, 24, 26, i.e., the connection of each audio equipment 14, 22, 24, 26 to interconnection apparatus 20.

The invention claimed is:

1. An electronic interconnection apparatus adapted for interconnecting a plurality of audio equipment, the apparatus comprising:
several communication ports, each configured for being connected to a respective audio equipment, one audio equipment being a headgear including at least one amongst a microphone and an audio receiving module, at least one other audio equipment being selected from a radio and an intercommunication system, each communication port operating according to a digital communication standard;
at least one selector configured for selecting, according to a manipulation by an operator, a value of an operating parameter;
at least one push-to-talk button configured for authorizing, following an action by the operator, transmission of an audio signal;
an electronic processing device connected to each of said at least one selector and to each of said at least one push-to-talk button, configured for acquiring an input audio signal via one of said communication ports, and for delivering an output audio signal to another of said communication ports, the output signal being obtained from the input audio signal; and
a management module (i) configured for managing a configuration of at least one of said communication ports, of said at least one selector and of said at least one push-to-talk button, and (ii) configured for modifying the configuration upon detection of a change of orientation of the apparatus with respect to a direction of extension along which the apparatus extends.

2. The apparatus according to claim 1, wherein the digital communication standard is a USB standard.

3. The apparatus according to claim 1, further comprising several connectors, each associated with a respective communication port, wherein said at least one selector comprises several selectors, wherein said at least one push-to-talk button comprises several push-to-talk buttons, and wherein said connectors, said selectors and respectively said push-to-talk buttons are arranged on either side of a median plane of the apparatus.

4. The apparatus according to claim 3, wherein a same number of said connectors, a same number of said selectors, and a same number of said push-to-talk buttons, respectively, are arranged on each side of the median plane.

5. The apparatus according to claim 3, wherein the apparatus extends along a direction of extension, and the median plane is perpendicular to the direction of extension.

6. The apparatus according to claim 3, wherein the number of said connectors and the number of said selectors and the number of said push-to-talk button are each an even number respectively.

7. The apparatus according to claim 6, wherein the number of said connectors is equal to four, the number of said selectors is equal to two, and the number of said push-to-talk buttons is equal to four, and wherein on each side of the median plane are arranged two connectors, one selector, and two push-to-talk buttons respectively.

8. The apparatus according to claim 1, wherein said management module is adapted to receive a configuration file, and is configured to modifying the configuration, according to the received configuration file.

9. The apparatus according to claim 1, wherein the direction of extension is a vertical direction, when the apparatus is worn by an operator along the operator's body.

10. The apparatus according to claim 1, further comprising a sensor detecting a change of orientation of the apparatus with respect to the direction of extension, said management module being connected to said sensor and detecting the change of orientation via said sensor.

11. The apparatus according to claim 1, wherein said management module is adapted to detect a connection of the headgear to one of said communication ports, and is configured for determining the orientation of the apparatus, depending on the communication port connected to the headgear.

12. The apparatus according to claim 3, wherein the number of said selectors is greater than or equal to two, and wherein configuration of each selector includes association with a respective operating parameter.

13. The apparatus according to claim 12, wherein the operating parameter is selected from the group consisting of: a receiving sound volume, an identifier of a set of one or several reception channels, and a transmission sound volume.

14. The apparatus according to claim 12, wherein the number of said selectors is equal to two, with one selector situated at the top of the apparatus according to the current orientation of the apparatus, and the other selector situated at the bottom according to the orientation, and wherein said management module associates a predefined operating parameter with the selector at the top.

15. The apparatus according to claim 14, wherein said management module changes the association between said selectors and respective operating parameters upon detection of a change of orientation of the apparatus.

16. The apparatus according to claim 3, wherein the number of said push-to-talk buttons is greater than or equal to two, and configuration of each push-to-talk button includes association with a respective set of one or several channels on which the audio signal is transmitted.

17. The apparatus according to claim 1, further comprising a wireless communication module configured for communicating with a respective audio equipment according to a radio communication protocol.

18. An audio system intended for equipping an operator, the system comprising:
a headgear including at least one amongst a microphone and an audio receiving module; and
the electronic interconnection apparatus of claim 1, connected to said headgear and connected to at least one other audio equipment selected from a radio and an intercommunication system.

* * * * *